(No Model.)

C. J. BOCKIUS.
METHOD OF MAKING LENS GLOBES.

No. 503,825. Patented Aug. 22, 1893.

Witnesses:
Chas. F. Burkhardt.
Theo. L. Popp.

Inventor.
Chas. J. Bockius
By Wilhelm Bonner
Attorneys.

UNITED STATES PATENT OFFICE.

CHARLES J. BOCKIUS, OF MARION, INDIANA, ASSIGNOR TO THE CANTON GLASS COMPANY, OF SAME PLACE.

METHOD OF MAKING LENS-GLOBES.

SPECIFICATION forming part of Letters Patent No. 503,825, dated August 22, 1893.

Application filed April 24, 1893. Serial No. 471,583. (No model.)

*To all whom it may concern:*

Be it known that I, CHARLES J. BOCKIUS, a citizen of the United States, residing at Marion, in the county of Grant and State of Indiana, have invented new and useful Improvements in Methods of Making Lens-Globes, of which the following is a specification.

This invention has reference to that class of lamp and lantern globes, chimneys and shades which are provided with lenses or bulls'-eyes protruding from the outer surface of the globe, chimney or shade, and attached thereto while both parts are hot or partly fused.

The object of this invention is to simplify the method of producing such articles.

Figure 1:
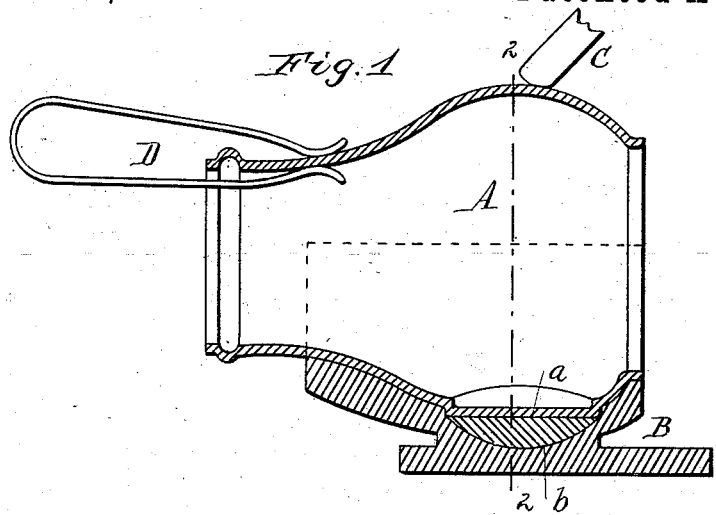
Figure 2:
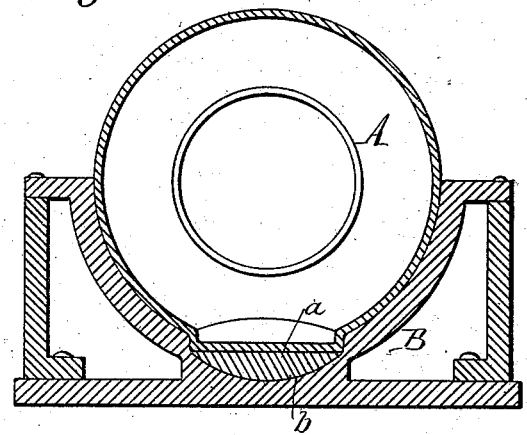
Figure 3:
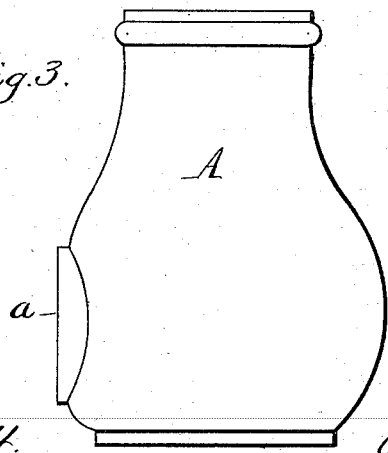

In the accompanying drawings:—Figure 1 is a longitudinal section of the mold in which a lantern globe is finished, the globe being shown in place in the mold. Fig. 2 is a cross section of the same in line 2—2, Fig. 1. Fig. 3 is a view of the globe before the lens is attached thereto.

Like letters of reference refer to like parts in the several figures.

In manufacturing a bull's-eye globe for a tubular lantern according to my improved method, the globe A is first blown in a suitable mold, which is so shaped as to produce a flat lens seat $a$ on one side of the globe. A small quantity of molten glass, sufficient to form the lens, is then placed in the depression $b$ of a half or open mold B. This depression is formed in the lower portion of the half mold in the proper location to register with the lens seat of the globe and has the proper form to produce the lens. The globe, in a hot or partly fused condition, is then taken out of its mold and placed with its flat lens seat downwardly in the half mold and is slightly pressed upon the molten glass in the mold, whereby the lens is formed and attached to the globe. The slight pressure which is required for this purpose can be readily applied by pressing upon the globe by means of the shears, which the operator uses for cutting off the molten glass for the lens, or some other implement C held in one hand of the operator, while the globe is being held by the tongues D. My method is very simple and expeditious, it can be executed by hand with the simplest tools and it produces a globe to which the lens is securely attached.

I am aware that it is not new to form the lens first and then place it hot in a mold in which the globe is blown against the lens. I am also aware that it is not new to blow the globe first and to then place the globe under a press, drop glass upon the globe and press such glass into the shape of a lens upon the globe.

I claim as my invention—

The herein described method of producing a globe, or analogous article, having a protruding lens, which consists in dropping the molten glass, for forming the lens, into the lens cavity of an open mold, blowing the globe in a separate mold, and then placing the globe while hot into the open mold containing the molten glass for the lens and uniting the latter with the globe by pressing the globe upon the glass in the lens cavity, substantially as set forth.

Witness my hand this 17th day of April, 1893.

CHARLES J. BOCKIUS.

Witnesses:
    WILLIAM L. LENFESTEY,
    CHARLES LENFESTEY.